United States Patent [19]
Mitzlaff et al.

[11] Patent Number: 6,014,102
[45] Date of Patent: Jan. 11, 2000

[54] METHOD AND APPARATUS FOR CALIBRATING LOCATION FINDING EQUIPMENT WITHIN A COMMUNICATION SYSTEM

[75] Inventors: James Edward Mitzlaff, Arlington Heights; John Duncan Toone, Cary, both of Ill.

[73] Assignee: Motorola, Inc., Schaumburg, Ill.

[21] Appl. No.: 09/062,424

[22] Filed: Apr. 17, 1998

[51] Int. Cl.[7] ...................................................... G01S 3/02
[52] U.S. Cl. ............... 342/457; 342/357.06; 342/357.09; 701/213; 701/214
[58] Field of Search ............................. 342/457, 357.06, 342/357.01, 357.09; 701/213, 214

[56] References Cited

U.S. PATENT DOCUMENTS

| | | | |
|---|---|---|---|
| 3,659,085 | 4/1972 | Potter et al. | 235/150.2 |
| 4,636,796 | 1/1987 | Imazeki. | |
| 4,833,478 | 5/1989 | Nossen. | |
| 5,327,144 | 7/1994 | Stilp et al.. | |
| 5,490,073 | 2/1996 | Kyrtsos | 364/449 |
| 5,508,708 | 4/1996 | Ghosh et al.. | |
| 5,523,763 | 6/1996 | Loomis | 342/357 |
| 5,686,902 | 11/1997 | Reis et al. | 340/825.54 |

*Primary Examiner*—Thomas H. Tarcza
*Assistant Examiner*—Dao L. Phan
*Attorney, Agent, or Firm*—Kenneth A. Haas

[57] ABSTRACT

Error vectors are added to any position estimate determined by Location finding equipment (LFE) in order to give a corrected position estimate. Error vectors are determined utilizing calibration terminals (114), which are roaming vehicles that move throughout the communication system's (100) coverage area. Each calibration terminal (114) comprises a remote unit (113) coupled with an independent position determining system (167) such as a Global Positioning System (GPS) receiver. Error vectors are determined by periodically polling calibration terminals (114). In response, each terminal (114) sends back a reply message containing their actual, independently determined location, along with periodically broadcasting a known sequence at increased power utilized by the LFE in determining a position estimate of the calibration terminal (114). The difference between the actual, and LFE determined position estimates are utilized in calculation of error vectors.

13 Claims, 2 Drawing Sheets

METHOD AND APPARATUS FOR CALIBRATING LOCATION FINDING EQUIPMENT WITHIN A COMMUNICATION SYSTEM

FIELD OF THE INVENTION

The present invention relates generally to cellular communication systems and, in particular, to a method and apparatus for calibrating location finding equipment within such communication systems.

BACKGROUND OF THE INVENTION

Radio location techniques have been widely used in many mobile transmitter location systems (e.g., Loran-C). There are three primary methods used to achieve the location of a remote unit within a commnunication system, namely the a) Time of Arrival (TOA), b) Time Difference of Arrival (TDOA) methods, and c) Angle of Arrival (AOA) methods.

TOA Method for Location: When the distances $\rho_1$ and $\rho_2$ between a remote unit and a pair of fixed base stations are known, the position of the remote unit may be computed by determining the point of intersection of two circles with radii $\rho_1$ and $\rho_2$, each centered at one of the fixed base stations. If an error exists in either or both distance determinations, the true position of the remote unit, P, will be displaced and observed to lie at the intersection P', of the perturbed radial arcs $\rho_{11}$ and $\rho_{12}$. A third base station is typically needed to unambiguously locate each remote unit at the unique point of intersection of the three circles. To accurately compute the remote unit location using this method, it is necessary to know precisely the instant the signal is emitted from the base stations and the instant it arrives at the remote unit. For this method to work properly, an accurate measurement of the total time delay along each of three remote unit to base station signal paths is necessary.

TDOA Method for Location: For this method of location, the observed time difference between pairs of signals arriving at the remote unit from three or more base stations are used to compute the location of the remote unit. The remote unit, by observing the time difference in arriving signals between base station pairs, can establish the hyperbolae or "lines of position" (LOPs'). In this method therefore, the location estimate can be obtained without knowledge of the absolute arrival time of the signal from each base station at the remote unit, only time differences in arrival are significant.

AOA Method for Location: AOA location is described in U.S. Pat. No. 4,636,796, RADIO DIRECTION FINDING SYSTEM, by Imazeki and U.S. Pat. No. 4,833,478, AUTOMATIC DIRECTION FINDER ANTENNA ARRAY, by Nossen. Both patents are incorporated by reference herein. According to such a method, the angle of arrival of a signal transmitted from a remote unit is determined by analyzing the amplitude (or phase) differences between multiple antennas at a base site. Antennas in one sector will receive the remote unit's signal at a different angle of arrival than antennas in other sectors. It is the difference in received amplitudes (or phases) of the remote unit's signal at various antennas that is utilized in determining the angle of arrival of the signal. A look-up table may be used to equate the measured amplitude (or phase) difference to an angle of arrival.

In order to improve the accuracy of Location Finding Equipment (LFE), the LFE must be continuously calibrated. Such calibration is needed due to the ever-changing environment in which the LFE operates. For example, continuously-changing Radio Frequency (RF) propagation effects such as multipath scattering and reflections require frequent LFE calibration to provide accurate remote unit location within the communication system. Prior-art methods for calibrating LFE utilize error correction data obtained from fixed calibration terminals existing at known locations within the communication system. As described in U.S. Pat. No. 5,327,144 "CELLULAR TELEPHONE LOCATION SYSTEM" by Stilp et al., these fixed calibration terminals are distributed in a grid pattern at known locations, covering the geographic area of the communication system. Calibration occurs by periodically locating the positions of the fixed calibration terminals and calibrating the LFE accordingly.

Although the prior-art calibration technique described by Stilp et al., does increase the accuracy of LFE, such a calibration technique is costly to implement due to the number of fixed calibration terminals that are needed. Additionally, because the fixed calibration terminals are distributed in a grid pattern, "holes" exist within the grid where no calibration data can be obtained. Because of this, a need exists for a method and apparatus for calibrating location finding equipment within a communication system that is less costly, and more accurate than priorart calibration techniques.

DETAILED DESCRIPTION OF THE DRAWINGS

Figure 1:
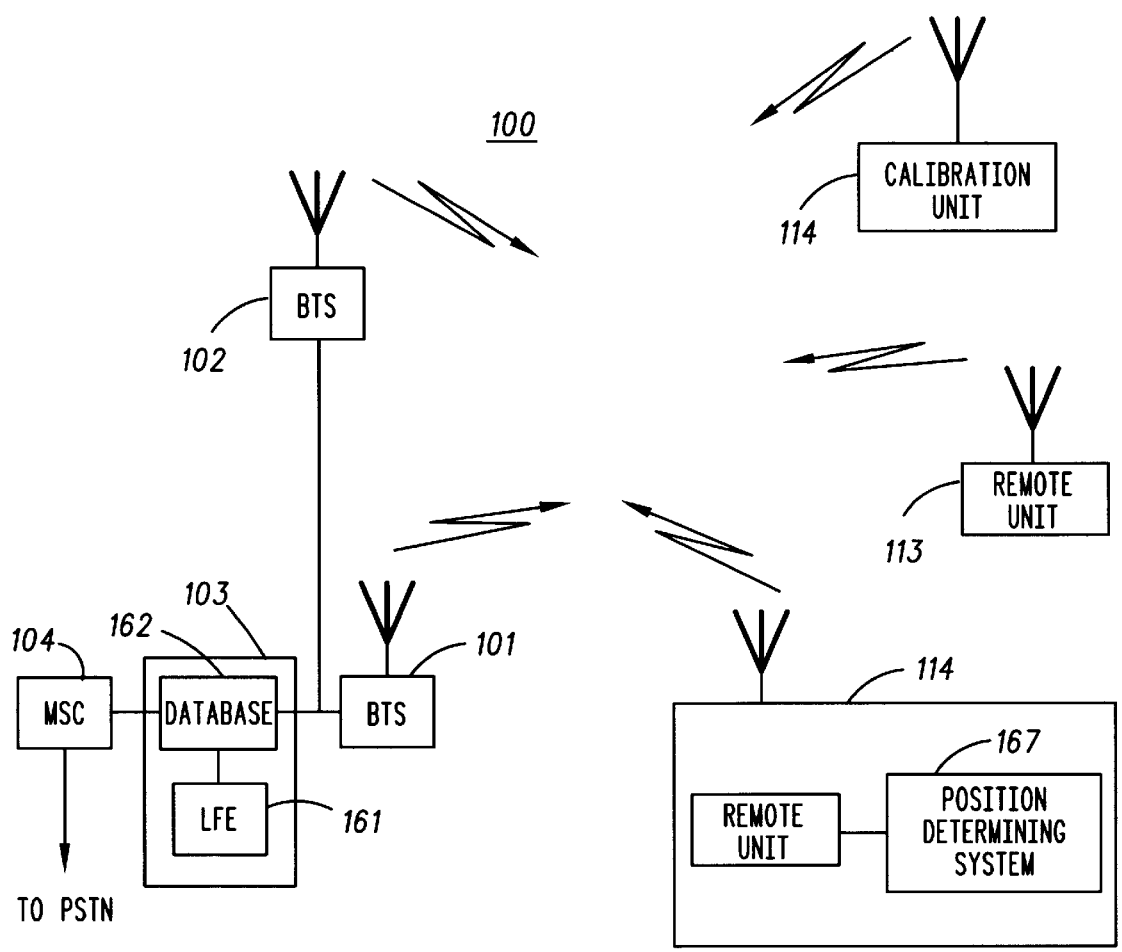
FIG. 1 is a block diagram showing a communication system in accordance with the preferred embodiment of the present invention.

To overcome the problems described above error vectors are added to any position estimate determined by Location finding equipment (LFE) in order to give a corrected position estimate. Error vectors are determined utilizing calibration terminals, which are roaming vehicles that move throughout the communication system's coverage area. Each calibration terminal comprises a remote unit coupled with an independent position determining system such as a Global Positioning System (GPS) receiver. Error vectors are determined by periodically polling calibration terminals. In response, each terminal sends back a reply message containing their actual, independently determined location, along with periodically broadcasting a known sequence at increased power utilized by the LFE in determining a position estimate of the calibration terminal. The difference between the actual, and LFE determined position estimates are utilized in calculation of error vectors.

Because of the roaming nature of the calibration terminals, comparatively few calibration terminals are needed to blanket a cellular communication system's coverage area. Therefore, the accuracy of the LFE system can be increased without the increased number of calibration terminals needed by prior-art calibration techniques. Additionally, because calibration terminals roam throughout a coverage area, calibration data can be obtained for much more of the coverage area than is possible with prior-art techniques.

The present invention encompasses a method for calibrating location finding equipment within a communication system. The method comprises the steps of receiving an independently transmitted first location of a calibration unit and determining, via the location finding equipment, a second location of the calibration unit. An error vector is determined based on the first and the second location and the location finding equipment is used to determine a location of the remote unit. Finally, the location of the remote unit is calibrated based on the error vector.

The present invention additionally encompasses a method for calibrating location finding equipment within a communication system. The method comprises the steps of receiving a plurality of independently transmitted first locations of a plurality of calibration units and determining, via the location finding equipment, a second plurality of locations of the plurality of calibration units. A plurality of error vectors is determined based on the plurality of first and second locations and stored along with the plurality of second locations of the calibration units. The location finding equipment is utilized to locate a remote unit and the plurality of error vectors is retrieved from the stored plurality of error vectors. Finally, the location of the remote unit is modified with the subset of the plurality of error vectors to produce a calibrated location estimate.

The present invention additionally encompasses an apparatus comprising a database comprising a plurality of error vectors and a plurality of location estimates. The apparatus additionally comprises location finding equipment coupled to the database, the location finding equipment outputting a calibrated location estimate based on the plurality of error vectors and the plurality of location estimates.

FIG. 1 is a block diagram showing wireless communication system 100 in accordance with the preferred embodiment of the present invention. Wireless communication system 100 is preferably a cellular communication system that utilizes a Code Division Multiple Access (CDMA) system protocol, however, in alternate embodiments of the present invention communication system 100 may utilize any analog or digital system protocol such as, but not limited to, the Advanced Mobile Phone Service (AMPS) protocol, the Global System for Mobile Communications (GSM) protocol, the Personal Digital Cellular (PDC) protocol, or the United States Digital Cellular (USDC) protocol. Communication system 100 comprises remote unit 113, a plurality of calibration units 114, wireless infrastructure equipment, including Base Stations 101 and 102, Centralized Base Station Controller (CBSC) 103, and Mobile Switching Center (MSC) 104. A communication system utilizing the CDMA system protocol is described in detail in "Personal Station-Base Station Compatibility Requirements for 1.8 to 2.0 GHz Code Division Multiple Access (CDMA) Personal Communication Systems" (American National Standards Institute (ANSI) J-STD-008). Additionally, in the preferred embodiment of the present invention, calibration units 114 are vehicles (such as police or courier vehicles) that constantly roam throughout communication system's 100 coverage area.

Operation of Communication system 100 in accordance with the preferred embodiment of the present invention occurs as follows: To initiate a location request, a command is originated at a regional entity such as MSC 104 or perhaps within a connected network such as Public Switched Telephone Network (PSTN) (not shown). The location request, which includes identification information on the remote unit that is to be located, enters MSC 104 and is passed to CBSC 103. CBSC 103 instructs all base stations within the cellular system, or a subset of those base stations identified previously by remote unit registration, to broadcast a power-up function (PUF) to remote unit 113, causing remote unit 113 to periodically broadcast a known sequence at increased power. (Details of the PUF can be found in Telecommunications Industry Association (TIA) contribution "Location Power Up Function," TR45.5.2.3/97.07.17.02 by A. Ghosh, G. Bruckert, B. Verbiscer and M. Panjwani and in ETSI SMG2 document UMTS A36/97 and U.S. Pat. No. 5,508, 708 dated Apr. 16, 1996 by Ghosh et. al.) After enough data has been collected, or a timer of finite duration initialized at commencement of probing expires, CBSC 103 instructs the serving base stations to send an acknowledgment (Ack) to remote unit 113, instructing it to cease transmission of the known sequence. The propagation delay at each base station is then forwarded, along with its base station identification, to a designated entity, (e.g., LFE 161), and the location of remote unit 113 is calculated based on the measurement of the propagation delay using TOA, TDOA, or a combination of TOA or TDOA with AOA.

In the preferred embodiment of the present invention, error vectors for the closest known locations are added to any LFE system position estimate in order to give a corrected position estimate. These error vectors are determined utilizing calibration terminals 114. As described above, calibration terminals 114 are roaming vehicles that move throughout communication system's 100 coverage area. Each calibration terminal 114 comprises a remote unit 113 coupled with an independent position determining system 167 such as a Global Positioning System (GPS) receiver. Error vectors are determined by periodically polling calibration terminals 114. In response, each terminal 114 sends back a reply message containing their actual, independently determined (via system 167) location, along with periodically broadcasting a known sequence at increased power utilized for LFE 161 location determination. In the preferred embodiment of the present invention, LFE 161 utilizes the known sequence transmitted from calibration terminals 114 for performing an estimated location for each terminal 114.

The LFE system simultaneously receives the actual location and estimates the position of each calibration terminal 114 as it is polled. This information is added to database 162. More particularly, database 162 contains the estimated position of each polled calibration terminal along with the corresponding error vector and the identifying information for the sites used to derive this estimated position. When remote unit 113 location is required, LFE 161 determines an initial position estimate utilizing known location methods, (i.e., TOA, TDOA, . . . etc.). LFE 161 then extracts a number of data entries from database 162 whose estimated positions were suitably close to the estimated position of remote unit 113. The database entries are then used to compute error vectors, using standard statistical techniques, that are added to the initial position estimate to give a corrected (or calibrated) position estimate. In the preferred embodiment of the present invention in addition to determining a corrected position estimate from the database entries, the entries are also used to compute an error vector variance which would give a measure of the uncertainty in any corrected position estimate.

In the preferred embodiment of the present invention, the mean error vector and error vector variance calculations are done each time a user position is to be estimated, however, in an alternate embodiment of the present invention, the system coverage area is broken up into small areas, and the error vector and error vector variance calculations are performed only for the area in which the remote unit is located.

Because of the roaming nature of calibration terminals 114, comparatively few calibration terminals 114 are needed to blanket a cellular communication system's coverage area. Therefore, the accuracy of the LFE system can be increased without the increased number of calibration terminals needed by prior-art calibration techniques. Additionally, because calibration terminals roam throughout a coverage area, calibration data can be obtained for much more of the coverage area than is possible with prior-art techniques.

Figure 2:
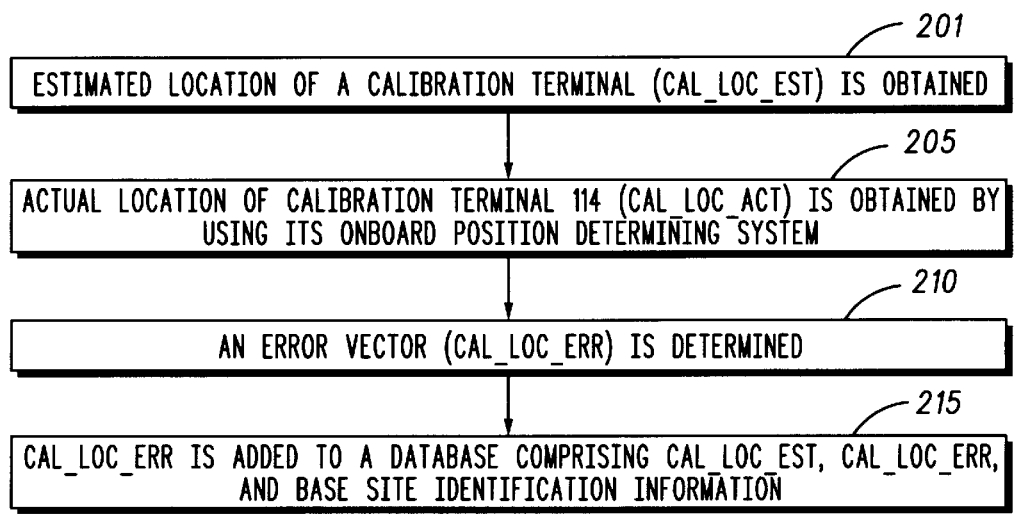
FIG. 2 is a flow chart showing the creation of the database of FIG. 1 in accordance with the preferred embodiment of the present invention.

FIG. 2 is a flow chart showing the creation of database 162 in accordance with the preferred embodiment of the present invention. The logic flow begins at step 201 where the estimated location of a calibration terminal (CAL_LOC_EST) is obtained. As discussed above, the location of calibration terminal 114 is calculated based on the measurement of the propagation delay using TOA, TDOA, or a combination of TOA or TDOA with AOA. In the preferred embodiment of the present invention CAL_LOC_EST comprises of an {x,y} pair which defines this location on a 2D linear co-ordinate system (i.e., latitude, longitude) or {x,y,z} in a 3D linear co-ordinate system (i.e., latitude, longitude, altitude). At step 205 the actual location of calibration terminal 114 (CAL_LOC_ACT) is obtained by using its onboard position determig system (i.e. system 167) and is reported to the cellular infrastructure equipment. CAL_LOC_ACT consists of an {x,y} pair (or {x,y,z} 3-tuple) which defines this location in the same co-ordinate system used for CAL_LOC_EST. At step 210 an error vector (CAL_LOC_ERR) is determined. In the preferred embodiment of the present invention CAL_LOC_ERR consists of an {x,y} pair (or {x,y,z} 3-tuple) which defines the error in the same co-ordinate system used for CAL_LOC_EST. In the preferred embodiment,

CAL_LOC_ERR=CAL_LOC_ACT−CAL_LOC_EST.

Finally, at step 215 CAL_LOC_ERR is added to a database comprising CAL_LOC_EST, CAL_LOC_ERR, and base site identification information. Such a database is depicted in Table 1 below.

TABLE 1

Database Representation

| CAL_LOPC_EST | CAL_LOC_ERR | Base Site Identification |
|---|---|---|
| $X_1, Y_1$ | $Xe_1, Ye_1$ | $BTS_{11}, BTS_{12}, BTS_{13}, \ldots BTS_{1x}$ |
| $X_2, Y_2$ | $Xe_2, Ye_2$ | $BTS_{21}, BTS_{22}, BTS_{23}, \ldots BTS_{2y}$ |
| $\ldots$ | $\ldots$ | $\ldots$ |
| $X_n, Y_n$ | $Xe_n, Ye_n$ | $BTS_{n1}, BTS_{n2}, BTS_{n3}, \ldots BTS_{nz}$ |

TABLE 1 is a representation of database 162 in accordance with the preferred embodiment of the present invention. As shown, database 162 comprises three columns. The first column comprises {x,y} coordinates of an estimation of a calibration unit's position (CAL_LOC_EST). The second column comprises {x,y} coordinates of the error (CAL_LOC_ERR) in estimating the location of the calibration unit, which is the difference between the actual, and the estimated position of the calibration unit. The final column comprises base site identification information for each base station that was utilized in determining the estimation of the calibration unit's position (CAL_LOC_EST). For example, if four base sites were utilized in determining the estimated location of the calibration unit (CAL_LOC_EST), then the corresponding base site identification field will contain identification information for the four base sites utilized. It should be noted that any number of base stations can be utilized in determining the estimated location for a calibration unit. Because of this, the base site identification field may contain any number (>=1) of base station identifications. In TABLE 1above, x base stations were utilized in determining $X_1, Y_1$, y base stations were utilized in determining $X_2, Y_2$, and z base stations were utilized in determining $X_n, Y_n$.

Figure 3:
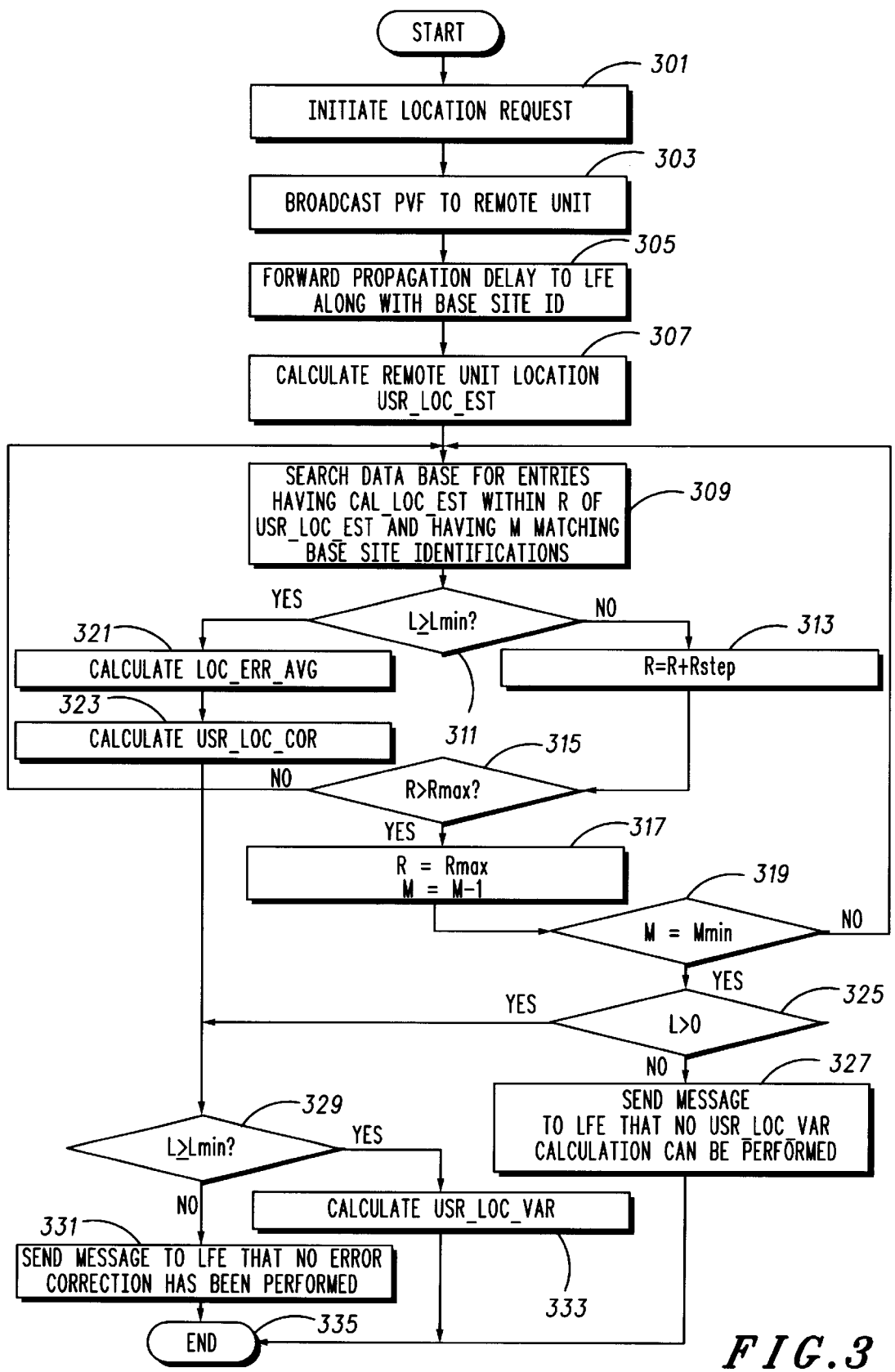
FIG. 3 is a flow chart illustrating operation of the communication system of FIG. 1 in accordance with the preferred embodiment of the present invention.

FIG. 3 is a flow chart showing operation of the communication system of FIG. 1 in accordance with the preferred embodiment of the present invention. The logic flow begins at step 301 where a location request is initiated. Next at step 303, CBSC 103 instructs all base stations within the cellular system, or a subset of those base stations, to broadcast a PUF to remote unit 113, causing remote unit 113 to periodically broadcast a known sequence at increased power. At step 305 the propagation delay received at each of M base stations is then forwarded, along with its base station identification, to a designated entity, (e.g., LFE 161), and the location of remote unit 113 (USR_LOC_EST) is calculated based on the measurement of the propagation delay using TOA, TDOA, or a combination of TOA or TDOA with AOA (step 307).

Next, at step 309 LFE 161 searches database 162 for all entries having CAL_LOC_EST within a radius R (R is initially set equal to 50 meters) around USR_LOC_EST and having M matching base site identifications. (Alternatively, LFE 161 may search database 162 for all entries having CAL_LOC_EST within a certain dx and dy distance from the {x,y} coordinates of USR_LOC_EST). In other words, LFE 161 searches database 162 for a number (L) of estimates of location for calibration units 114 that are within a given distance from the current remote unit location estimate (USR_LOC_EST) and were made utilizing the same M base stations that were utilized in determining USR_LOC_EST.

At step 311 LFE 161 determines if there exists at least $L_{min}$ entries that meet the above criteria. More particularly, LFE 161 determines if there exists a subset (at least three ($L_{min}$=3)) of entries in database 162 in which all M base stations were utilized in the determination of CAL_LOC_EST, with each entry having CAL_LOC_EST within a radius R of USR_LOC_EST. If at step 311 it is determined that the above criteria are met, then the logic flow continues to step 321 otherwise the logic flow continues to step 313 where R is increased by $R_{step}$ (preferably 50 meters). At step 315 it is determined if $R > R_{max}$, and if not the logic flow returns to step 309, otherwise the logic flow continues to step 317. (In the preferred embodiment of the present invention $R_{max}$ is set equal to 250 meters).

At step 317 R is set to equal $R_{max}$, M is reduced by 1, and the logic flow continues to step 319 where it is determined if $M = M_{min}$, ($M_{min} >= 0$) and if not the logic flow returns to step 309, otherwise the logic flow continues to step 325.

At step 325 it is determined if any entries within database 162 have been found that meet the above criteria. In other words, at step 325 it is determined if L>0, and if not, the logic flow continues to step 327 where LFE 161 outputs a notification that no error correction has been performed and the logic flow ends at step 335. If at step 325 it is determined that L>0, the logic flow continues to step 321.

At step 321 LOC_ERR_AVG is calculated by summing together all the CAL_LOC_ERR vectors, then dividing by the number of entries. In other words, LOC-ERR_AVG is the average of the CAL_LOC_ERR vectors that meet the above criteria. Next, at step 323 the error corrected user terminal location USR_LOC_COR is calculated as follows:

USR_LOC_COR=USR_LOC_EST+LOC_ERR_AVG, and output as the user terminal location. Logic flow then continues to step 329, where it is determined if L>=$L_{min}$, and if not, the logic flow continues to step 331 where LFE 161 outputs a notification that no location error variance calculation can be performed and the logic flow ends at step 335. If at step 329 it is determined that L>=Lmin, the logic flow continues to step 333 where the location error variance (USR_LOC_VAR) is calculated by generating a set of L vectors representing the distances between LOC_ERR_AVG and the endpoints of each of the error vectors. The sum of the squared magnitudes of the error vectors is computed and the result is divided by L-1 to determine USR_LOC_VAR. USR_LOC_VAR is then output from LFE 161. The logic flow ends at step 335.

While the invention has been particularly shown and described with reference to a particular embodiment, it will be understood by those skilled in the art that various changes in form and details may be made therein without departing from the spirit and scope of the invention. For example, the process of incrementing R, then decrementing M in steps 313 through 319 could be reversed, so that M is decremented to $M_{min}$ prior to incrementing R.

What is claimed is:

1. A method for calibrating location finding equipment within a communication system, the method comprising the steps of:

receiving an independently transmitted first location of a mobile unit;

determining, via the location finding equipment, a second location of the mobile unit;

determining an error vector based on the first and the second location;

determining, via the location finding equipment, a location of a remote unit; and modifying the location of the remote unit with the error vector to produce a calibrated location estimate.

2. The method of claim 1 wherein the step of determining via the location finding equipment, the second location of the mobile unit and the location of the remote unit comprises the step of determining a location via any combination of a Time of Arrival (TOA), Time Difference of Arrival (TDOA), or a Angle of Arrival (AOA) method of location.

3. The method of claim 2 further comprising the step of broadcasting a power-up function (PUF) to aid in determining the second location and the location of the remote unit.

4. The method of claim 1 wherein the step of modifying the location of the remote unit with the error vector comprises the step of modifying the location of the remote unit with a plurality of error vectors determined with mobile units having a closest known location to the location of the remote unit.

5. The method of claim 1 further comprising the step of calculating an uncertainty in the calibrated location estimate based on the error vector.

6. The method of claim 1 wherein the step of receiving the independently transmitted first location of the mobile unit comprises the step of receiving a Global Positioning System (GPS) measurement from the mobile unit.

7. A method for calibrating location finding equipment within a communication system, the method comprising the steps of:

receiving a plurality of independently transmitted first locations of a plurality of calibration units;

determining, via the location finding equipment, a second plurality of locations of the plurality of calibration units;

determining a plurality of error vectors based on the plurality of first and second locations;

storing the plurality of error vectors along with the plurality of second locations of the calibration units;

determining, via the location finding equipment, a location of a remote unit;

retrieving the subset of the plurality of error vectors from the stored plurality of error vectors; and modifying the location of the remote unit with the subset of the plurality of error vectors to produce a calibrated location estimate.

8. The method of claim 7 wherein the step of determining via the location finding equipment, the second plurality of locations of the plurality of calibration units, and the location of the remote unit comprises the step of determining a location via any combination of a Time of Arrival (TOA), Time Difference of Arrival (TDOA), or Angle of Arrival (AOA) method of location.

9. The method of claim 8 further comprising the step of broadcasting a power-up function (PUF) to aid in determining the second locations and the location of the remote unit.

10. The method of claim 7 wherein the step of modifying the location of the remote unit with the subset of the plurality of error vectors comprises the step of modifying the location of the remote unit with a plurality of error vectors calculated with calibration units within a first distance from the location of the remote unit, and not calculated with calibration units greater than the first distance from the location of the remote unit.

11. The method of claim 7 further comprising the step of calculating an uncertainty in the calibrated location estimate based on the subset of the plurality of error vectors.

12. The method of claim 7 wherein the step of receiving the plurality of independently transmitted first locations of the plurality of calibration units comprises the step of receiving a Global Positioning System (GPS) measurement from the calibration unit.

13. An apparatus comprising:

location finding equipment coupled to the database, the location finding equipment having an independently transmitted first location of a mobile unit as an input and outputting an error vector based on the first location of the mobile unit and an estimated location of the mobile unit; and a database having the error vector and the estimated location of the mobile unit as an input.

* * * * *